United States Patent
Mason, Jr.

[11] 3,913,244
[45] Oct. 21, 1975

[54] SINGLE ENGINE-SIMULATOR OF TWIN-ENGINE

[76] Inventor: Samuel H. Mason, Jr., 603 Virginia Terrace, Santa Paula, Calif. 93060

[22] Filed: June 14, 1973

[21] Appl. No.: 370,150

[52] U.S. Cl. .................................. 35/12 B; 35/125
[51] Int. Cl.² ........................................... G09B 9/08
[58] Field of Search ....... 35/12 R, 12 T, 12 P, 12 B, 35/12 S

[56] References Cited
UNITED STATES PATENTS

| | | | |
|---|---|---|---|
| 3,078,595 | 2/1963 | Dawson, Jr. et al. | 35/12 T |
| 3,085,355 | 4/1963 | Carpenter et al. | 35/12 T |
| 3,451,146 | 6/1969 | Pancoe et al. | 35/12 P |
| 3,651,583 | 3/1972 | Clark et al. | 35/12 B |

*Primary Examiner*—Robert W. Michell
*Assistant Examiner*—John H. Wolff

[57] ABSTRACT

Preferably a joint simulator of both twin engine throttle control and of twin engine fuel admixture control for each of the twin engine throttles. The single motor is typically representative in response to the control adjustments to the total sound of the simulated twin-engine total sound, and preferably the rudder and/or mirror(s) is(are) positioned such that the position of the rudder may be observed at all times by the trainee.

5 Claims, 8 Drawing Figures

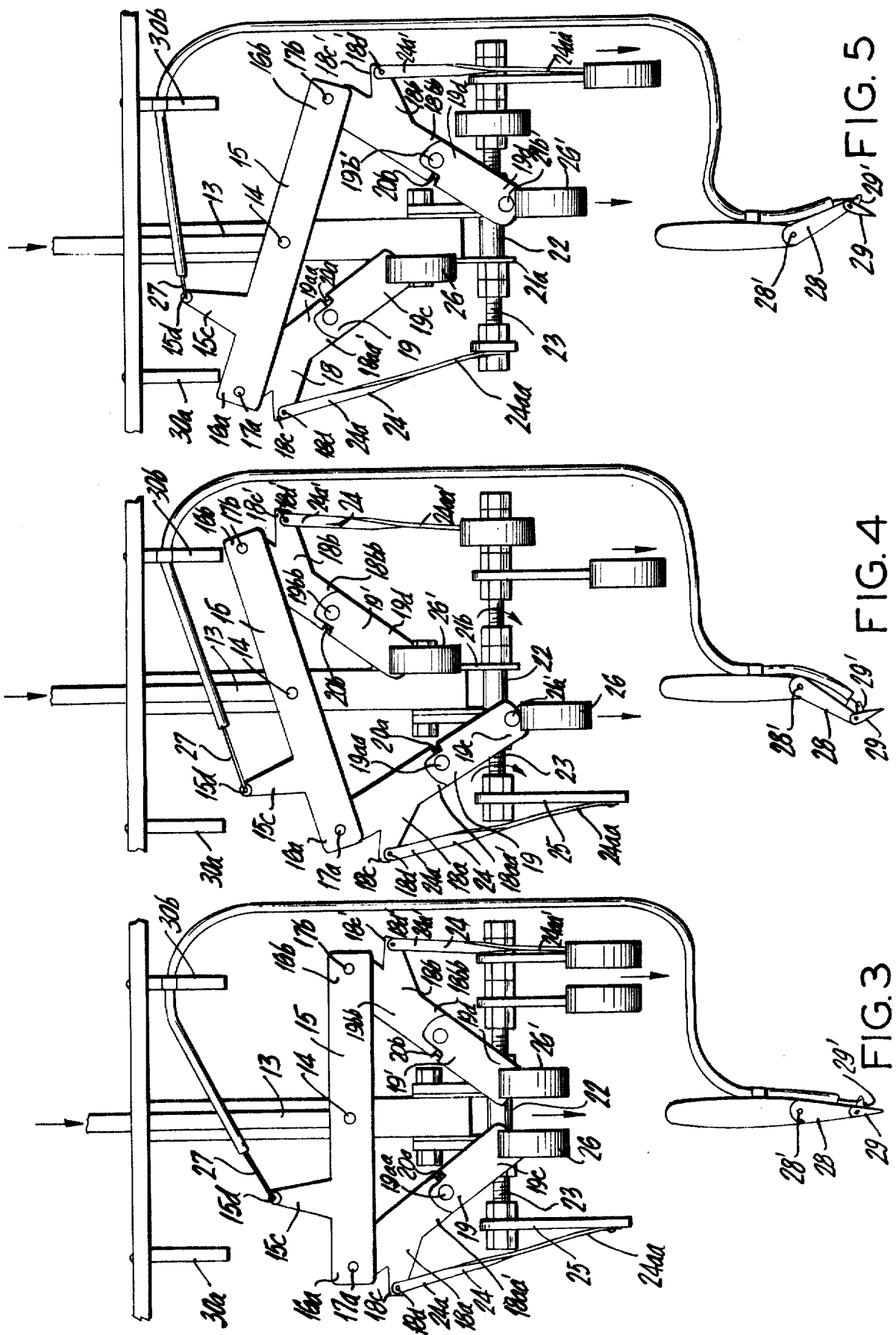

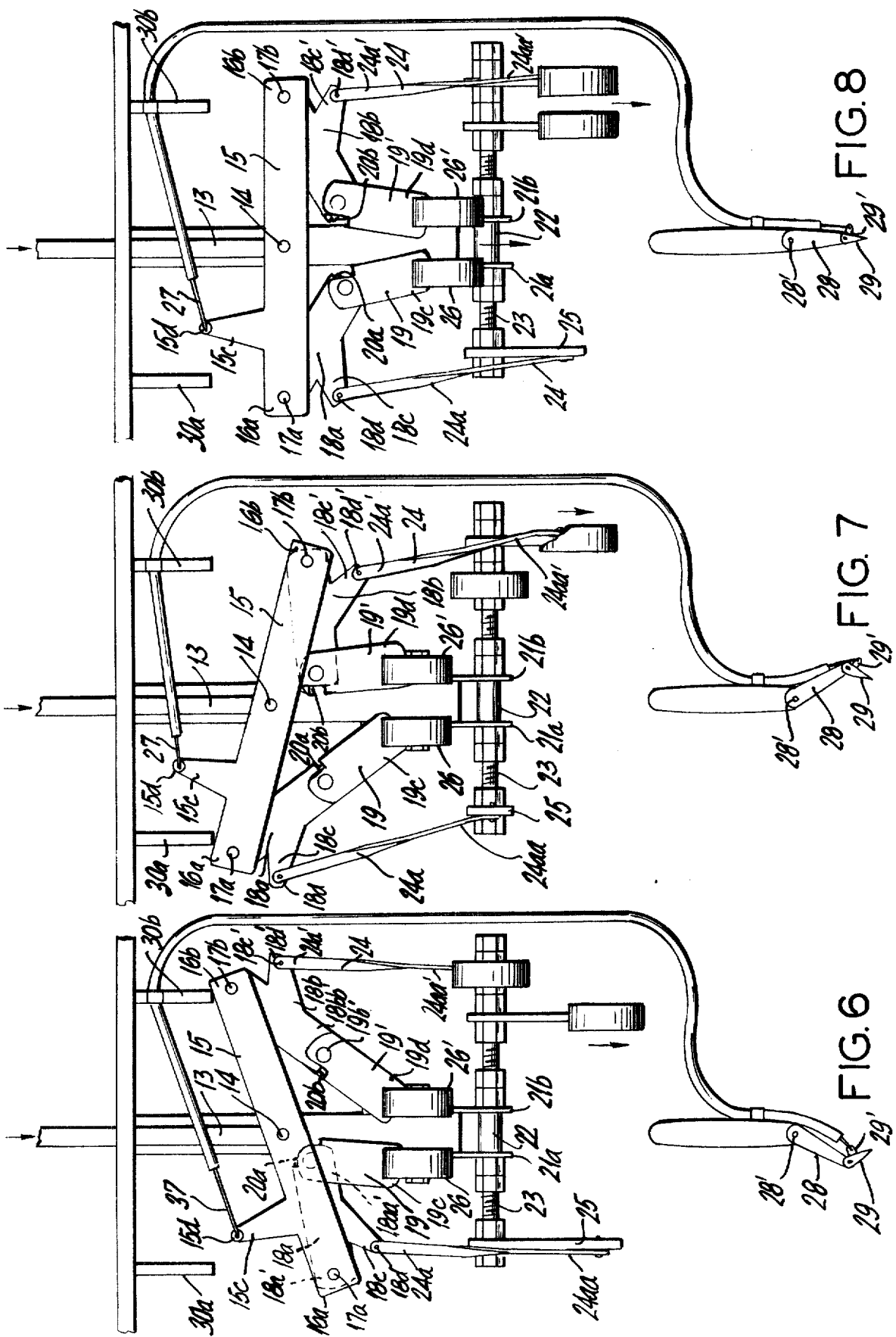

SINGLE ENGINE-SIMULATOR OF TWIN-ENGINE

This invention relates to a simulator of a two-engine aircraft by a novel device.

BACKGROUND TO THE INVENTION

Prior to the present invention, typically there have existed instrumentation simulator mechanisms for aircraft and as the nature of the modern aircraft have become more complex, so also has the simulator instrumentation. Although there are many different types of simulators for different types of instrumentation and controls of the aircraft, typical of such simulation devices are those of U.S. Pat. No. 2,995,831 and U.S. Pat. No. 3,456,362 for example. However, neither of these patents nor other prior art known to the inventor relate to the problem of advance training a pilot trainee to be prepared for the basic control and compensation procedures for regulating and/or varying throttles and fuel enrichments for the respective engines of a two-engine aircraft as well as the teaching to the trainee of the effect to be expected upon the failure of one of the two engines and the corrective procedures essential to avoid loss of control of the aircraft. It is this problem and field to which the present invention is directed.

SUMMARY OF THE INVENTION

Accordingly, an object of the present invention is to obtain a simulator for simulating throttle control and regulation for a twin-engine aircraft.

Another object is to obtain a simulator for simulating control and regulation of a fuel-enrichment for each of respective ones of twin engines of a twin-engine aircraft.

Another object is to obtain a twin-engine aircraft simulator utilizable of a single engine throttle.

Another object is to obtain a simulator of a twin-engine aircraft devoid of electronic circuitry in the basic structure of the simulator.

Another object is to obtain a twin-engine simulator of simple construction and low cost in materials and manufacture thereof.

Another object is to obtain a twin-engine aircraft simulator of throttle and fuel-enrichment controls which are reflective of characteristic forces, torques, sound, sights, feel and/or the like the same as those experienced in actual flying and control of a twin-engine aircraft.

Other objects become apparent from the following and preceding disclosure.

One or more objects of the present invention are obtained by the invention as defined herein.

Broadly the invention may be defined as a simulator of twin-engine aircraft throttle-controls having typically-appearing and position separate simulating dual throttle levers (as if for two separate motors) preferably also with simulation controls of also fuel-enrichment mechanisms for each of dual engine by having also simulating separate dual-enrichment levers (as if for two motors) utilizable in conjunction with separate ones of the throttle levers each singularly as well as both throttle levers jointly, while simultaneously preferably the actual single motor produces noise proportionate to and in response to the extent of being throttle up or down to the extent that fuel is or is not enriched, such that the pilot trainee experiences in direct proportion the noise, preferably the simulator being located in a wind tunnel with the throttle and enrichment levers being interconnected with a rudder against which moving air has the same effect as in a plane for various rudder positions, particular rudder position being arranged for particular lever positions to give corresponding "field" as would occur in actual twin engine flight. The simulator however is mountable on a single engine throttle shaft and interconnected as noted with the rudder or a regular single engine aircraft. Thus, noise and feel, appearance of control lever positions, rudder position, effect of motor failure and/or cut back and/or fuel-enrichment modification each are possible to be simulated and experienced by virtue of manipulation of the levers as noted above, preferably utilizing solely a single throttle of in fact a single engine as noted above. The present simulator device may be utilized in a non-flying simulator plane or preferably as a mounted part of a regular single-engine aircraft but with the result of obtaining forces and effects the same and/or characteristic of those to be expected in a twin-engine aircraft.

The above-objects one or more as broadly stated in the preceding paragraph is (are) obtained in at least a preferred embodiment by an elongated lever arm about centrally of its length pivoted on the single throttle shaft with the shaft being axially movable by simultaneous movement of both of opposite ends of the lever arm — when positioned about transversely of the shaft — forwardly or rearwardly or alternatively when maintaining one end of the lever arm about stationary while moving forwardly or backwardly the opposite other end of the lever arm. Accordingly the opposite ends of the lever arm may have handles or other lever arrangements on each respectively thereof as representative of a throttle lever or knob of one engine while the lever or knob operatively connected to the opposite remaining end of the lever arm is representative of a throttle lever or knob of the other engine of a twin-engine aircraft.

However, as in a real situation of a twin-engine, the advancing of a throttle to increase the rpm (revolutions per minute) of a motor in fact advances the rpm less when fuel enrichment is low or decreased than when the fuel enrichment is high or is increased, and to simulate that condition per throttle lever attached to one end of the lever arm, the throttle lever itself includes a movable fulcrum point which also is movably mounted for manipulation forwardly and backwardly relative to the point of attachment of the single-engine throttle shaft attachment point with the lever arm, this fulcrum point being mounted on a lever identified as fuel-enrichment control such that upon turning or moving the fuel-enrichment control in a direction to move the fulcrum forwardly, the rpm of the motor are increased by causing the lever arm to move the throttle forwardly when the opposite other end of the lever arm remains about stationary or also advances forwardly; similarly the rpm of the motor is increased by forward movement of the axially moving throttle shaft when the fulcrum point remains about fixed while the throttle lever thereof advances.

In getting the effect and feel of the twin-engine plane (aircraft) the advancement of either the fulcrum point — by fuel enrichment of the left motor (simulated) for example, or the left motor throttle lever or knob, if the right fuel-enrichment remains unchanged and/or if the right throttle lever or knob is not advanced or if one or the other of the right fuel-enrichment control and the right throttle lever control is (are) deminished, the effect on the plane is to increase rpm but also to give the effect of turning the rudder rightwardly; the opposite situation would in a true twin-engine situation have the effect of turning the rudder leftwardly. Accordingly, there may be attached and in a preferred embodiment is attached a connector with either a simulated rudder within the pilot's view and/or a real rudder connected by the connector to the lever arm such that when the left throttle and/or fuel enrichment is advanced and/or when the right throttle and/or fuel enrichment is backed-off (decreased), the rudder or rudder simulator or both turn right and accordingly in a real single engine plane causes the plane to yaw right the same as would be experienced in a real twin-engine aircraft under these control conditions; the opposite is true for the reverse situation for these same left engine controls. Also the same is true for the right-engine controls except that the direction of turn of the rudder is opposite to that for the left-engine controls.

When both left and right throttles are advance, the rpm of the single engine is further advanced because of both ends of the lever arm moving forwardly to thereby push forward further the axially (in the illustrated embodiment) movable throttle shaft, and similarly the opposite is true when both move rearwardly. The same effect is also experienced if both engines are simulated to be enriched by moving both the left fulcrum point forwardly and the right fulcrum point forwardly simultaneously, or the reverse maneuvers for an opposite effect. Intermediate situations of throttling-up and/or of yaw are obtained by joint varied manipulations of the left and right throttles and fuel-enrichment differently for the left than for the right throttles of the simulator and/or for the left than for the right fuel-enrichment controls' simulators.

For each of left and right controls, the respective throttle lever and its associated fuel-enrichment lever are commonly joined to an intermediate link which link in-turn is joined to its respective end of the lever arm, and the point of joining of the fuel-enrichment lever to the link to thereby provide a fulcrum point about which the throttle-lever end of the link may pivot, is spaced laterally into a non-aligned position between the point of attachment of the throttle lever pivotably and of the lever arm to the link. Such arrangement also allows for necessary bending or flexing pivotably of the throttle lever while nevertheless maintaining throttle-up effect when advanced forwardly because the fulcrum point nevertheless is still anchored whereby forward force on the lever arm results but to a lesser extend when the fuel-enrichment lever's fulcrum point has been retracted as by reducing the fuel enrichment thereof.

These relationships may be more fully understood by reference to the following Figures.

THE FIGURES

FIG. 3 illustrates a view analagous to FIG. 2, with the left and right throttles and left and right fuel enrichment levers all the way rearwardly back in an idle position.

FIG. 4 illustrates a view analagous to FIGS. 2 and 3 but with the right throttle and right fuel-enrichment both fully advanced while the left throttle and left fuel-enrichment both have remained in the idle position, giving a left-rudder yaw effect.

FIG. 5 illustrates a view analagous to that of FIG. 4, except with the controls the exact reverse of that of FIG. 4 in their adjustment, with the left throttle and left fuel-enrichment both fully advanced and right ones in the idle position of a right-rudder yaw effect.

FIG. 6 is analogous to the FIG. 2 full throttle state for both engines and full enrichment for the right engine but with a cut-back low-enrichment position for the left-engine simulation fuel-enrichment control, corresponding to a left-rudder yaw effect.

FIG. 7 is analogous to the FIG. 6 illustration but with solely the right engine fuel-enrichment in a cut-back low-enrichment position, corresponding to a right-rudder yaw effect.

Figure 2:
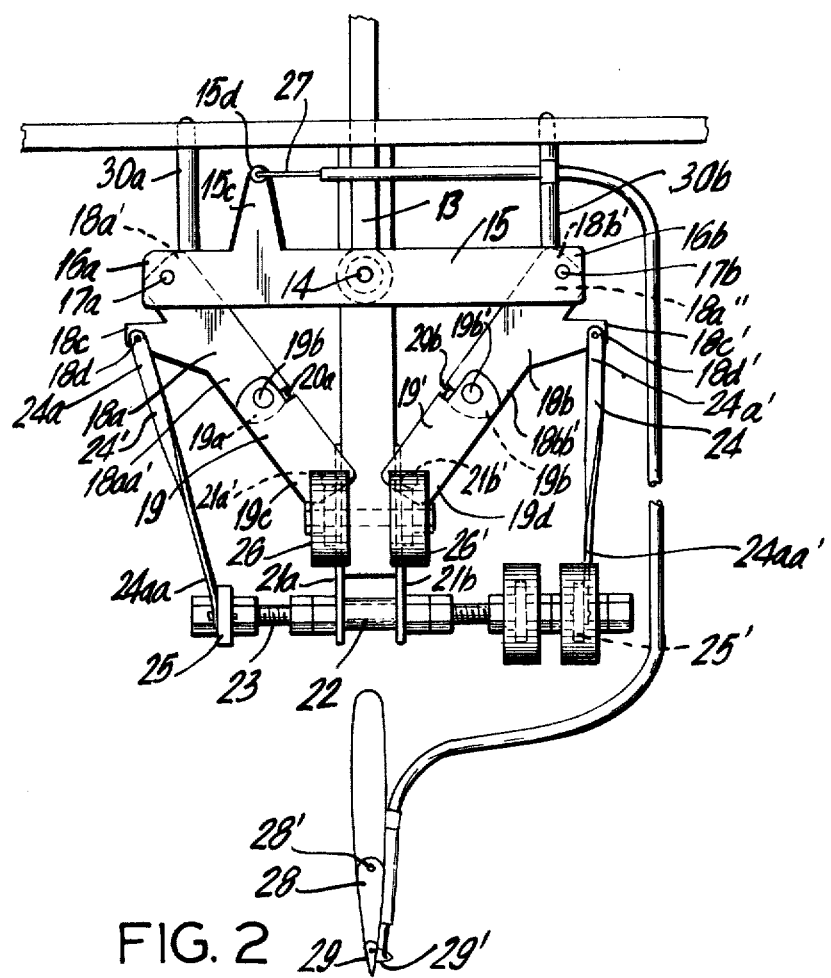
FIG. 2 illustrates an elevation plan view of an inpart view of the basic mechanism-structure of the preferred embodiment illustrated in FIG. 1, at full throttles and enrichments.

FIG. 8 corresponds to FIGS. 2, 6, and 7 but with both left and right engine fuel-enrichment control simulators in the cut-back low-enrichment position thereby having no yaw effect as in the FIG. 2 situation.

DETAILED DESCRIPTION OF THE INVENTION

In each of the illustrated embodiments, it should be noted that there is a stop-key flange bent upwardly into a cut-away edge of the throttle lever attached to the link having the stop-key, in order to avoid the possibility of the elbow-pivotable attachment with the link from accidentally flexing in the wrong direction; such a key is not the sole remedy but merely preferred and may be replaced by any other conventional stop means or other desired method or structure.

Figure 1:
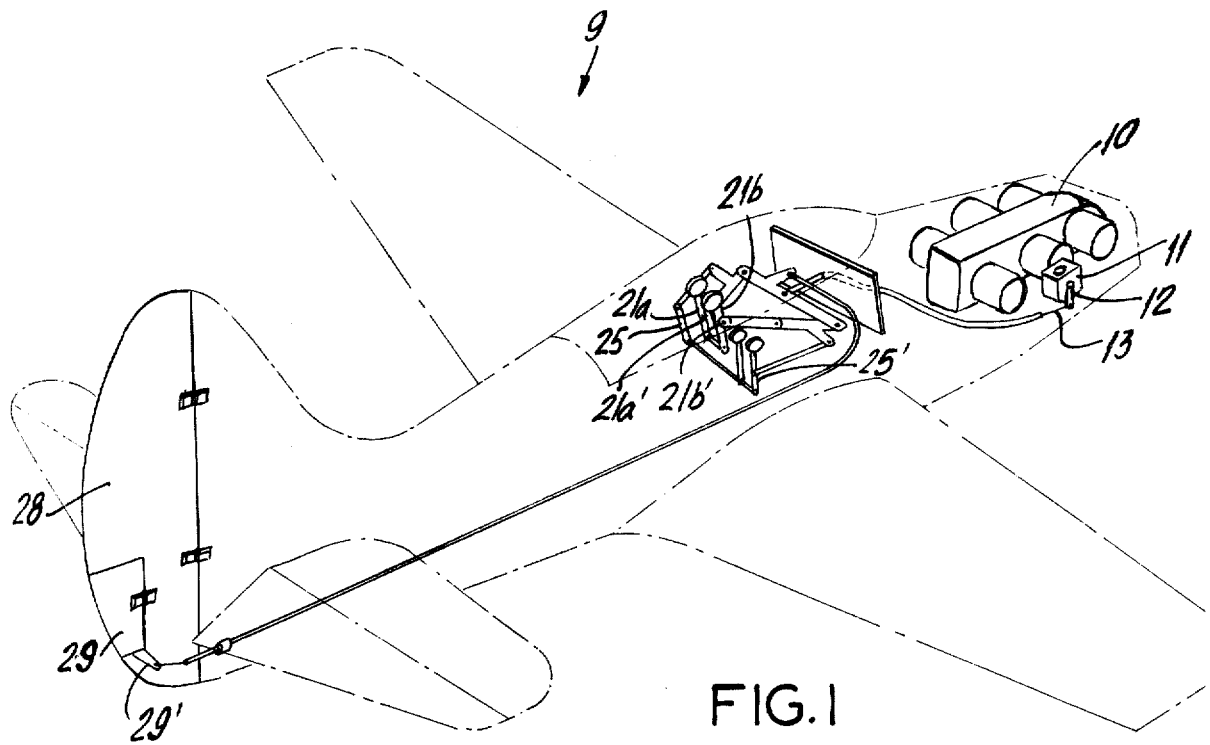
FIG. 1 illustrates a typical and preferred embodiment of the present invention in rearward side elevation perspective view, showing the single engine plane body in phantom and showing solely the controls to which the present invention is directed.

In greater detail, with reference to the several Figures, FIG. 1 illustrates an aircraft 9 shown in phantom, having a conventional one-engine 10 of a single-motor aircraft, with its conventional carburetor 11 and its carburetor lever 12 having attached thereto an axially movable throttle-cable shaft (single throttle shaft) 13 pivotably attached by pivot mounting element 14 about centrally of elongated pivot element 15. At opposite ends 16a and 16b of lever arm 15 are additional pivot elements 17a and 17b pivotably connecting links 18a and 18b respectively at ends 18a' and 18b', the opposite link ends 18aa' and 18bb' being respectively attached to ends 19a of throttle lever 19 and 19b of throttle lever 19' by pivot elements 19aa and 19bb respectively. Flange keys 20a and 20b respectively of links 18a and 18b respectively, extend within cut-outs of and against the edges of throttle levers 19 and 19' respectively, the opposite throttle lever ends 19c and 19d being attached to handle means 21a and 21b by pivot elements 21a' and 21b', each of throttle levers 19 and 19' being respectively actuated by movement of the handle means 21a and 21b each of which pivot on member 22 which is rotatably mounted around shaft 23. At points on fulcrum extensions 18c and 18c' at pivot elements 18d and 18d', fuel-enrichment lever 24 and 24' are respectively attached at their ends 24a and 24a' by the pivot elements 18d and 18d', while opposite ends 24aa and 24aa' respectively to the fuel-enrichments handle means 25 and 25'. The handle means 25 is movable by knob 26 through the rigid interconnecting shaft 23, to which handle means 25 and knob 26 each are fixedly connected, whereas knob 26' directly is connected with handle means 25' for the move thereof. Connector 27 to rudder 28 is connected to the pivoted flange 29 such that axial movement toward the rudder serves to push member 29 by its connecting projection 29' to thereby cause the rudder 28 to pivot right as in FIGS. 5 and 7 around pivot element 28'. Connector 27 is connected to flange 15c by pivot element 15d. Stops 30a and 30b limit forward movement of respective lever arm ends 16a and 16b.

It is to be understood that the illustrations of the present invention illustrate merely preferred embodiments of the present invention and that it is within ordinary mechanical skill to make such variations, modifications, and substitution of equivalents as would be apparent to a person of ordinary skill.

I claim:

1. An aircraft-type twin-engine fuel-control simulator device comprising in combination: a single throttle shaft element mountable for first to and fro movement simulative of increased throttle and decreased throttle in simulation of separate throttle shafts for separate twin engines of an aircraft; a pivot element pivotably mounting a link pivotable on said throttle shaft element; two bilaterally separate throttle-fuel enrichment control lever means each for simulating a different one of dual throttle-positions and each for separately effecting said first to and fro movement of said shaft element; each of said separate throttle-fuel enrichment control-lever means including a separate throttle-lever means for simulating a throttle handle and for manual actuation of said single throttle shaft element, and a separate fuel-enrichment-lever means for simulating a fuel-enrichment handle and for manual actuation of said throttle shaft element; each of said separate throttle-lever means when moved in one predetermined direction each being movable of the pivotable link in one of second to and fro directions and thereby being simultaneously movable of said single throttle shaft element in its corresponding said first to and fro directions, each of said separate fuel-enrichment-lever means when moved in one predetermined direction each being movable of said single throttle shaft element in its corresponding said first to and fro directions, and when each of separate throttle-lever means and the separate fuel-enrichment-lever means is moved in reverse direction each respectively serving to move each of the pivotable link and accordingly also the single throttle shaft element in a reversely opposite direction of said first and second to and fro directions, and one of the bilaterally two separate throttle-fuel enrichment control-lever means being movable of the single throttle shaft element in one of said first to and fro directions and the other remaining one of the bilateral two separate throttle fuel enrichment control-lever means being movable of a single throttle shaft means in an opposite one of said first to and fro directions, such that each of the two bilaterally separate throttle-fuel enrichment control-lever means is simulative of one of twin engines of an aircraft and such that jointly the two bilaterally separate throttle-fuel enrichment control-lever means modify the overall effect of each thereof on movement of said pivotable link and of said single throttle shaft element.

2. A twin-engine aircraft fuel-control simulator device of claim 1, in which said pivotable lever is elongated and is mounted pivotably about centrally thereof between opposite ends thereof and between pivotable mounting points of mounting of the bilaterally two separate throttle-fuel enrichment control-lever means of which one of the bilaterally two separate throttle-fuel enrichment control-lever means is mounted at one end portion and the other of the bilaterally two separate throttle-fuel enrichment control-lever means is mounted at an opposite end of the pivotable lever.

3. A twin-engine aircraft fuel-control simulator device of claim 2, in which each of the bilaterally two separate throttle-fuel enrichment control lever means includes a first link element attached pivotably at one end to said pivotable lever and attached at another end thereof to one of said separate throttle-lever means and said separate fuel-admixture-lever means, and at a third point of said link element, said third point being in non-linear alignment with points of attachment of the link element to each of the pivotable lever and the one of said separate throttle-lever means and said separate fuel-admixture lever means, there being at the third point a remaining other of said separate throttle-lever means and said separate fuel-admixture-lever means such that each of the separate throttle-lever means and the separate fuel-admixture-lever means serves as a fulcrum point for the other of the separate throttle-lever means and the separate fuel-admixture-lever means.

4. A twin-engine aircraft fuel-control simulator device of claim 3, including a connector element connected to said pivotable lever at a point spaced from said pivot element and a pivotably mounted aircraft rudder operatively connected to an opposite end of the connector element such that movement to and fro of the end portion to which the connector element is connected to the pivotable lever is impartable of left and right to and fro alternate movement of the rudder.

5. A twin-engine aircraft fuel-control simulator device of claim 1, including a connector element connected to said pivotable lever at a point spaced from said pivot element and a pivotably mounted aircraft rudder operatively connected to an opposite end of the connector element such that movement to and fro of the end portion to which the connector element is connected to the pivotable lever is impartable of left and right to and fro alternate movement of the rudder.

* * * * *